(12) United States Patent  (10) Patent No.: US 9,372,884 B2
Puszkiewicz et al.  (45) Date of Patent: Jun. 21, 2016

(54) EXTENSIBLE DATA QUERY SCENARIO DEFINITION AND CONSUMPTION

(75) Inventors: Piotr Milosz Puszkiewicz, Issaquah, WA (US); Roger Mall, Sammamish, WA (US); Ziv Kasperski, Bellevue, WA (US); Zachary Schellhardt, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 47 days.

(21) Appl. No.: 13/517,611

(22) Filed: Jun. 14, 2012

(65) Prior Publication Data

US 2013/0339382 A1 Dec. 19, 2013

(51) Int. Cl.
*G06F 17/30* (2006.01)
*G06Q 30/02* (2012.01)

(52) U.S. Cl.
CPC .... *G06F 17/30389* (2013.01); *G06F 17/30864* (2013.01); *G06Q 30/02* (2013.01)

(58) Field of Classification Search
None
See application file for complete search history.

(56) References Cited

U.S. PATENT DOCUMENTS

| | | | |
|---|---|---|---|
| 7,693,973 B2 | 4/2010 | Joseph et al. | |
| 7,792,811 B2 * | 9/2010 | Nagarajayya | 707/706 |
| 7,801,850 B2 | 9/2010 | Moore et al. | |
| 2003/0101169 A1 * | 5/2003 | Bhatt et al. | 707/3 |
| 2005/0256892 A1 * | 11/2005 | Harken | 707/101 |
| 2007/0168578 A1 | 7/2007 | Balchandran et al. | |
| 2008/0103794 A1 | 5/2008 | Pettiross et al. | |
| 2008/0256012 A1 | 10/2008 | Bernstein et al. | |
| 2012/0191716 A1 * | 7/2012 | Omoigui | 707/740 |
| 2012/0278355 A1 * | 11/2012 | Kritt et al. | 707/769 |

OTHER PUBLICATIONS

Nadhan, et al., "A Strategic Approach to Data Transfer Methods", Retrieved at <<http://msdn.microsoft.com/en-us/library/aa480064.aspx>>, Feb. 27, 2009, pp. 16.

Amer-Yahia, et al., "A Web-Services Architecture for Efficient XML Data Exchange", Retrieved at <<http://ieeexplore.ieee.org/stamp/stamp.jsp?arnumber=01320024>>, In Proceedings. of IEEE 20th International Conference on Data Engineering, Mar. 30, 2004, pp. 12.

* cited by examiner

*Primary Examiner* — Rehana Perveen
*Assistant Examiner* — Raheem Hoffler
(74) *Attorney, Agent, or Firm* — Nicholas Chen; Doug Barker; Micky Minhas

(57) ABSTRACT

Content providers define a set of scenarios that are addressed by their datasets. The scenarios include user-friendly, human-readable attributes such as a title, description, and visualization. The scenarios may also include a technical description that can be used to generate sample queries that can then be executed against the dataset. The technical description may be machine translated to arbitrary data querying protocols while maintaining the semantic meaning of the query. A user interface may be provided to allow users to intuitively generate the scenarios. In one embodiment, an extensible framework provides for the creation of protocol-specific translation plug-ins that are used to generate implementations of the scenario suitable for selected protocols. Known market-relevant translator plug-ins may also be implemented.

20 Claims, 6 Drawing Sheets

EXTENSIBLE DATA QUERY SCENARIO DEFINITION AND CONSUMPTION

BACKGROUND

Data publishers, web services, and others may offer datasets to potential subscribers via a data marketplace or other venues. Often the datasets are very large tables with many columns and rows. A subscriber who is interested in the dataset may not have sufficient knowledge of the dataset or its format to properly access the data. Subscribers and others who did not create the dataset may not know which columns to filter on and which columns to provide as query results.

The general content of a dataset can be easily identified, for example, as weather, financial, geographic, or other data. However, it is not easy for subscribers to understand what type of information can be pulled from the dataset or how to construct queries to gather desired data. This may be a particular problem when using complex datasets that requires detailed knowledge of the dataset format in order to compose useful queries.

In some cases, additional problems arise when the dataset uses a query format that is not compatible with the subscriber's platform.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In addition to typical descriptions of the dataset contents, dataset publishers provide examples of how to use their dataset in one embodiment. When a dataset is offered to subscribers, the publisher defines one or more questions that can be answered by the dataset. The publisher also defines the query code required to answer those questions. In a data marketplace, for example, a subscriber is shown the example questions answered by the dataset and is provided code having the appropriate values that correspond to the question. One or more terms in the query may be highlighted or otherwise designated as variable or subscriber-selectable so that the subscriber can understand how to modify the sample query to ask other questions. As a result, the subscriber does not have to know how the dataset is organized in order to use the dataset, but instead can use the pre-formatted queries to begin using the dataset immediately.

In some cases, the subscriber's platform may not support the query language used by the dataset or the subscriber may not be familiar with the dataset's native format. A translation engine is used to translate the sample query, or other queries, to a target format selected by the subscriber. This allows the subscriber to obtain queries that both ask a desired question of the dataset and do so in a format that the subscriber can deploy in existing applications.

Data brokers, such as aggregators and marketplaces, may provide content providers, such as dataset publishers, with the ability to define scenarios for their datasets once and then rely on the aggregator to appropriately translate the scenario into sales and consumption models best suited for end-users.

In one embodiment, content providers define a set of scenarios that are addressed by their dataset. The scenarios include user-friendly, human-readable attributes such as a title, description, and visualization. The scenarios may also include a technical description that can be used to generate sample queries that can then be executed against the dataset. The technical description may be machine translated to arbitrary data querying protocols while maintaining the semantic meaning of the query. A user interface may be provided to allow users to intuitively generate the scenarios.

In one embodiment, an extensible framework provides for the creation of protocol-specific translation plug-ins that are used to generate implementations of the scenario suitable for selected protocols. Known market-relevant translator plug-ins may also be implemented.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
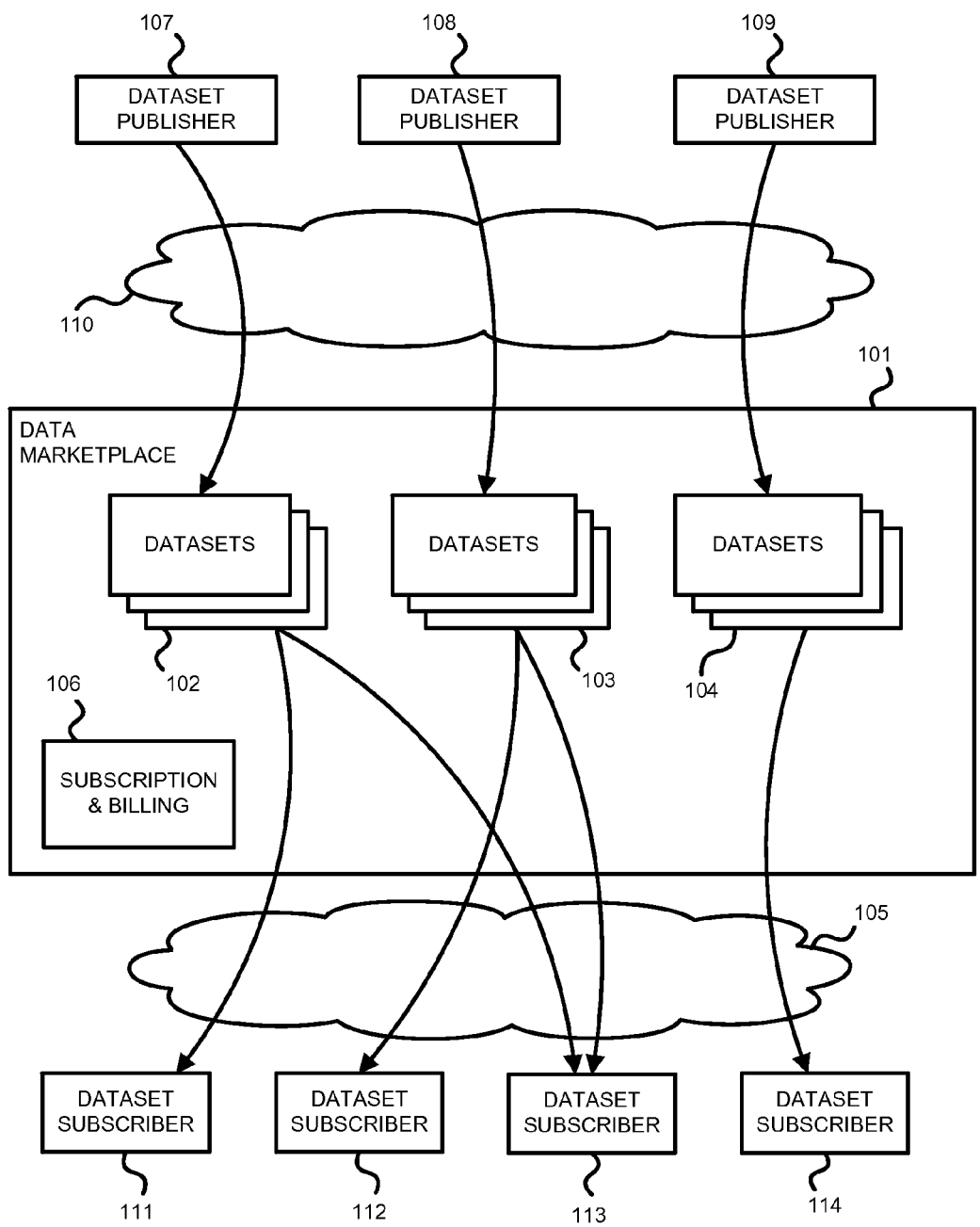
FIG. 1 is a block diagram illustrating a data marketplace that offers datasets and APIs to users according to one embodiment.

FIG. 1 is a block diagram illustrating a data marketplace 101 that offers datasets and APIs to users according to one embodiment. Marketplace 101 comprises a plurality of datasets 102-104 that are available for use by subscribers. Marketplace 101 may be a website hosted on a web server that is accessed by subscribers via a public or private network 105, such as an intranet or Internet. The subscribers may browse the available datasets 102-104 listed on data marketplace 101. When a subscriber identifies useful or desired content in marketplace 101, subscription and billing module 106 allows the subscriber to purchase a subscription to the selected content.

The data marketplace content, such as datasets 102-104, is provided by dataset publishers 107-109. The content may be uploaded to marketplace 101 by dataset publishers 107-109 via a public or private network 110, such as an intranet or Internet. Alternatively, the datasets may be accessed remotely by the marketplace on behalf of subscribers. In one embodiment, some or all of the publishers and developers are independent from and unrelated to the operator of marketplace 101 and the subscribers. Marketplace 101 provides a centralized location for the dataset publishers 107-109 to offer their content to potential subscribers.

Dataset publishers 107-109 collect, correlate, and organize information on selected any subject matter. The data dataset publishers 107-109 then makes the processed information available as datasets 102-104 on data marketplace 101. Datasets 102-104 may use a standardized protocol for querying data, such as the Open Data Protocol (OData). Dataset subscribers 111-114 may have an interest in or need for the information available in one or more datasets 102-104. Data marketplace 101 allows a subscriber 111-114 to review many datasets from a number of different data publishers 107-109 without having to identify and seek out each dataset publisher separately. Once a subscriber selects a dataset, subscription and billing module 106 allows the subscriber to enter into a contract for access to the dataset. Subscription and billing module 106 also handles billing to the dataset subscriber and payment to dataset publisher.

In one embodiment, one or more datasets 102-104 are designed to operate in a cloud environment in which hosted services are delivered over the Internet or some other network. Subscriptions to datasets 102-104 may be sold on a flat-fee or an on-demand basis. Access to the datasets may also be elastic so that the user may have as much or as little of a dataset as required at any given time. Additionally, datasets 102-104 may be fully managed by the publishers 107-109 so that the subscriber needs nothing but a computer and network access to the dataset.

Some datasets 102-104 may be adapted to operate on external datasets that are not available via data marketplace 101. A subscriber to an external dataset may use an API to access the dataset. For example, an API for the dataset may provide the subscriber with a link or access to such an external dataset. The subscribers 111-114 access the datasets using a selected query language or format. Different subscribers 111-114 may require different query formats based upon the application using the dataset.

Figure 2:
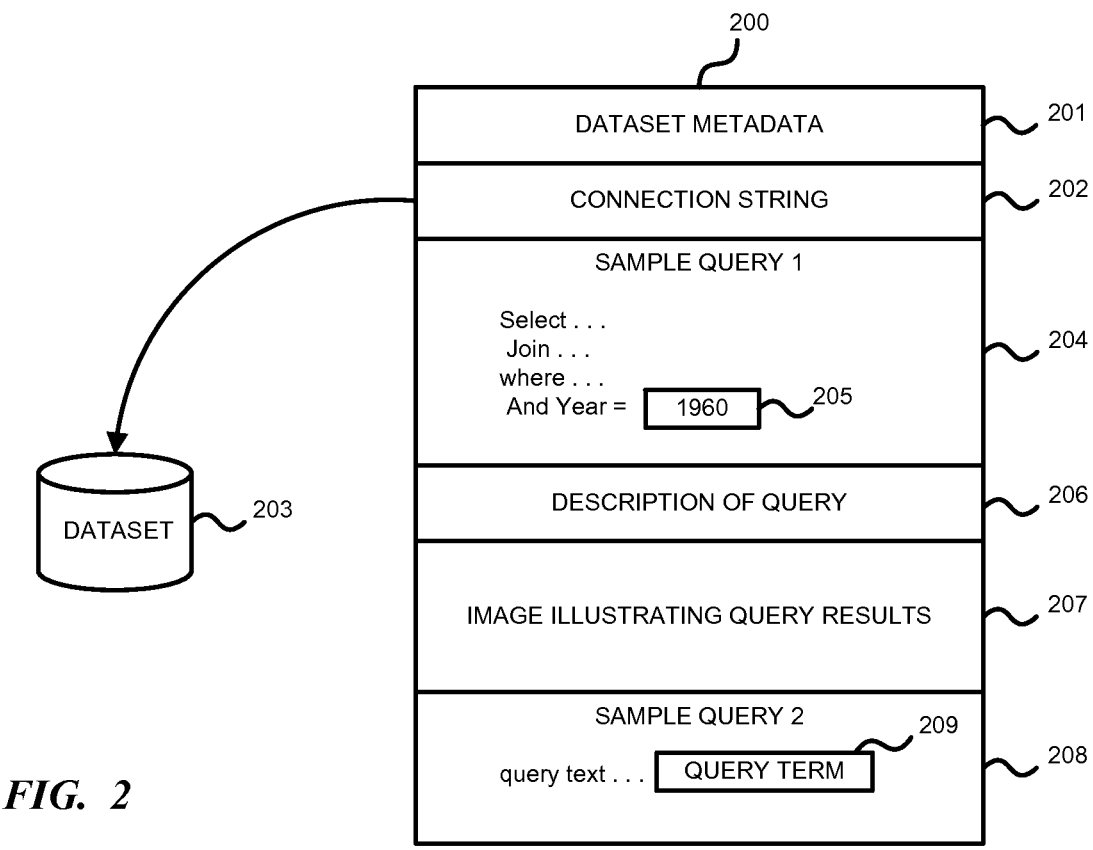
FIG. 2 illustrates the type of information that a dataset publisher would provide to the data marketplace to publish the dataset in one embodiment.

FIG. 2 illustrates the type of information 200 that a dataset publisher would provide to the data marketplace to publish the dataset in one embodiment. The dataset publisher provides dataset metadata 201, such as a dataset name, billing structure, maintenance/update schedule, database type, or any other information that may be useful to the data marketplace to support the dataset. Connection string 202 is a pointer, address, or any other information required to identify the location of dataset 203. The dataset 203 may be uploaded entirely to the data marketplace or it may be hosted externally by the dataset publisher or a third party.

A first sample query 204 is provided by the dataset publisher. Query 204 is an example of how a subscriber may use and/or access dataset 203. For example, if dataset 203 is a SQL database, then query 204 may be example T-SQL statements that a subscriber would use to communicate with dataset 203 for a particular query. Sample query 204 may identify certain query parameters 205 that can be modified. For example, if sample query 204 requests data for a certain year, the publisher may indicate that other dates 205 may also be used to query the dataset.

The dataset publisher also may provide a description 206 of the query. Description 206 explains to potential subscribers what type of information may be pulled from the dataset and how the sample query is structured, for example. An image 207 illustrating the query results may be provided. For example, a chart, map, table, or some other visualization of the results of sample query 204 is shown in image 207.

Additional sample queries 208 with other selectable query terms 209 may also be provided by the publisher to illustrate additional information that can be collected from the dataset. The sample queries 204 and 208 may be in an appropriate syntax for the platform hosting dataset 203. However, the subscribers may require or desire different query formats depending upon the platform used by the subscribers. In one embodiment, the data marketplace translates the sample queries into other formats selected by the subscribers.

Figure 3:
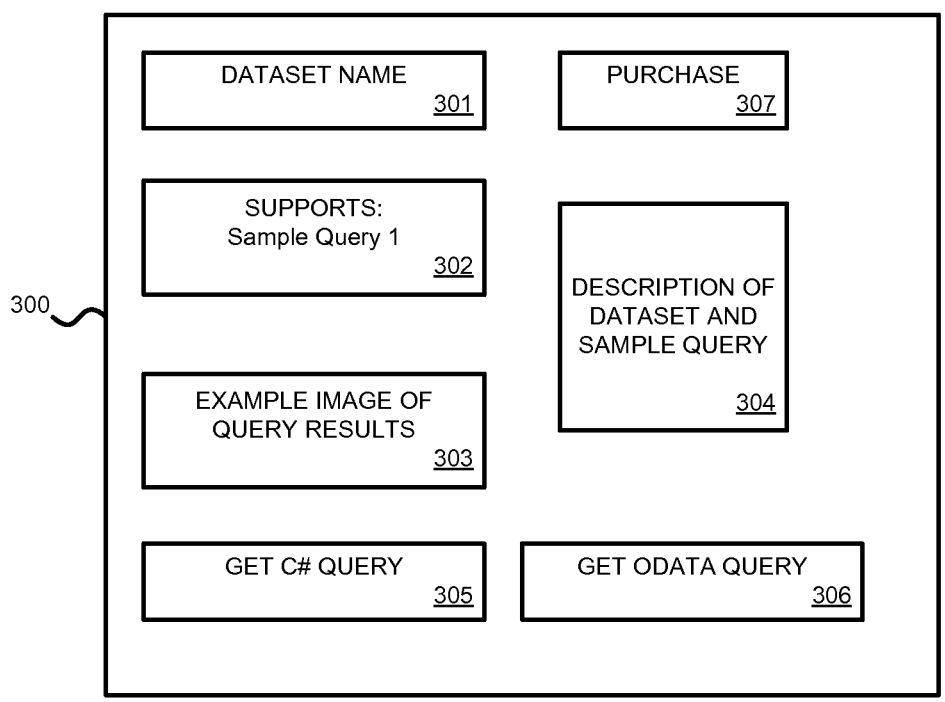
FIG. 3 illustrates dataset information provided to subscribers on the data marketplace according to one embodiment.

FIG. 3 illustrates dataset information 300 provided to subscribers on the data marketplace according to one embodiment. The data marketplace may provide separate listings 300 for each dataset offered. The dataset listing 300 may include information collected from the dataset publisher, such as the information shown in FIG. 2, and other features offered specifically by the data marketplace. The dataset name 301 is shown along with one or more sample queries 302. The sample queries 302 may be selected from the publisher-provided information 204 and 208 and provide the potential subscriber with examples how the dataset may be used. Examples images 303 are provided for the output of the dataset using sample query 302. These images may include charts, graphs, text, or any other output data format supported by the dataset. A description 304 of the dataset contents and they sample queries is also shown.

The subscriber may not be able to use the format of the sample query, for example, if the subscriber's platform does not support the syntax of the sample query or if the subscriber is not familiar with that format. Accordingly, the data marketplace is capable of translating the sample queries into other formats so that the subscriber can evaluate how the dataset can be used in other applications. For example, the user may request the sample query in C# by selecting option 305 or in OData syntax by selecting option 306. The data marketplace will then convert the sample query to a format requested by the subscriber. If the subscriber may then purchase access to the dataset using option 307.

Figure 4:
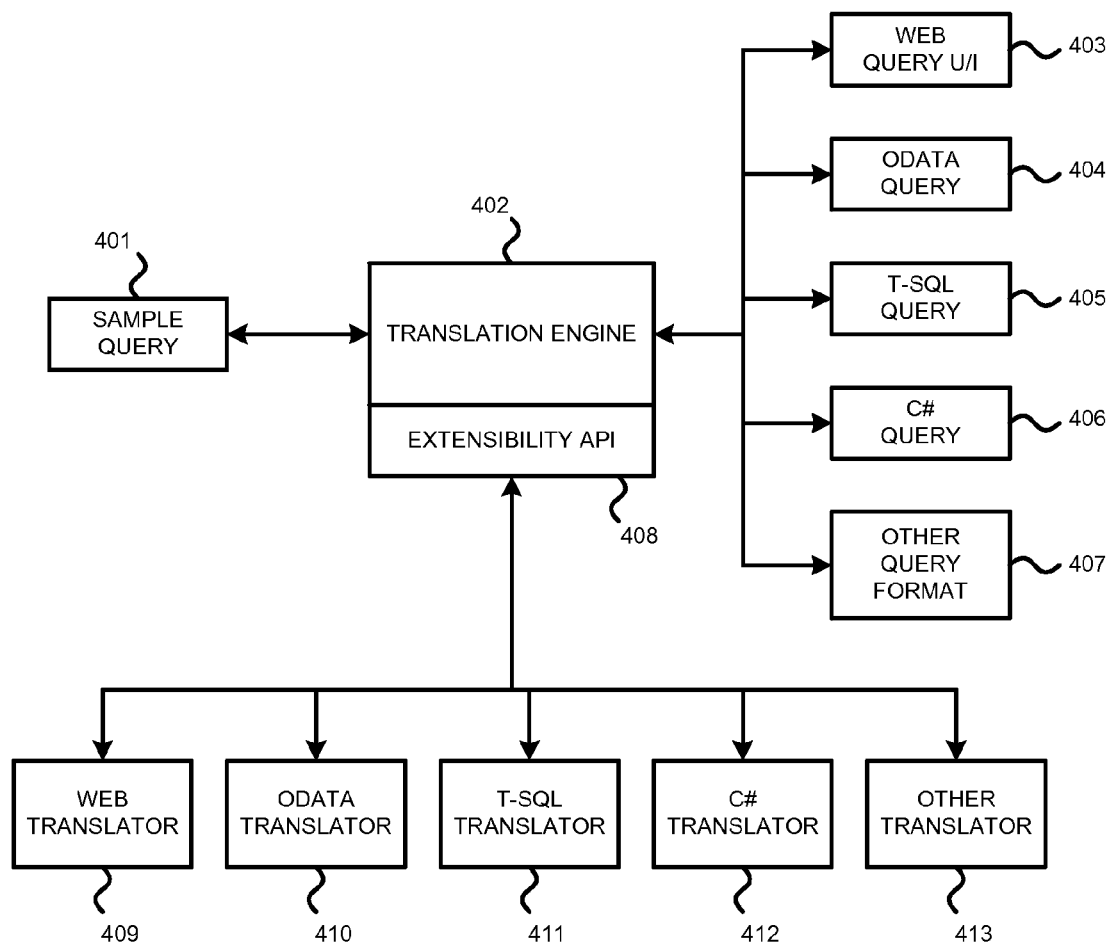
FIG. 4 is a block diagram of a system for translating sample dataset queries to other formats according to one embodiment.

FIG. 4 is a block diagram of a system for translating sample dataset queries to other formats according to one embodiment. A subscriber may select a target format for a sample query 401 listed with a database of interest. The sample query is provided to translation engine 402, which converts the original query to a format selected by the subscriber. For example, if the offered sample query will not work on the subscriber's platform, then the query may translated into a web query user interface 403, such as a format associated with the data marketplace, an OData query 404, T-SQL query 405, C# query 406 or any other appropriate query format 407.

Translation engine 402 may be a software application that is designed to convert statements from one query format to another. In some cases, translation engine 402 may not have the capability perform a desired translation. Extensibility API 408 may be used by translation engine 402 to access external translation applications, such as web translator 409, OData translator 410, T-SQL translator 411, C# translator 412, or any other translator 413. The translator applications 409-413 may provide plug-in support for a platform-specific format required by the subscriber. The translator converts the sample query 401 and returns the query to engine 402, which outputs the translated query to the user.

Although query 401 is listed as a "sample query," it will be understood that any valid query for a dataset may be used with translation engine 402. Once a user subscribes to the dataset, other queries can be written for the dataset in the native format for the dataset. Those native-format queries may then be translated to a format appropriate to the subscriber's platform.

Figure 5:
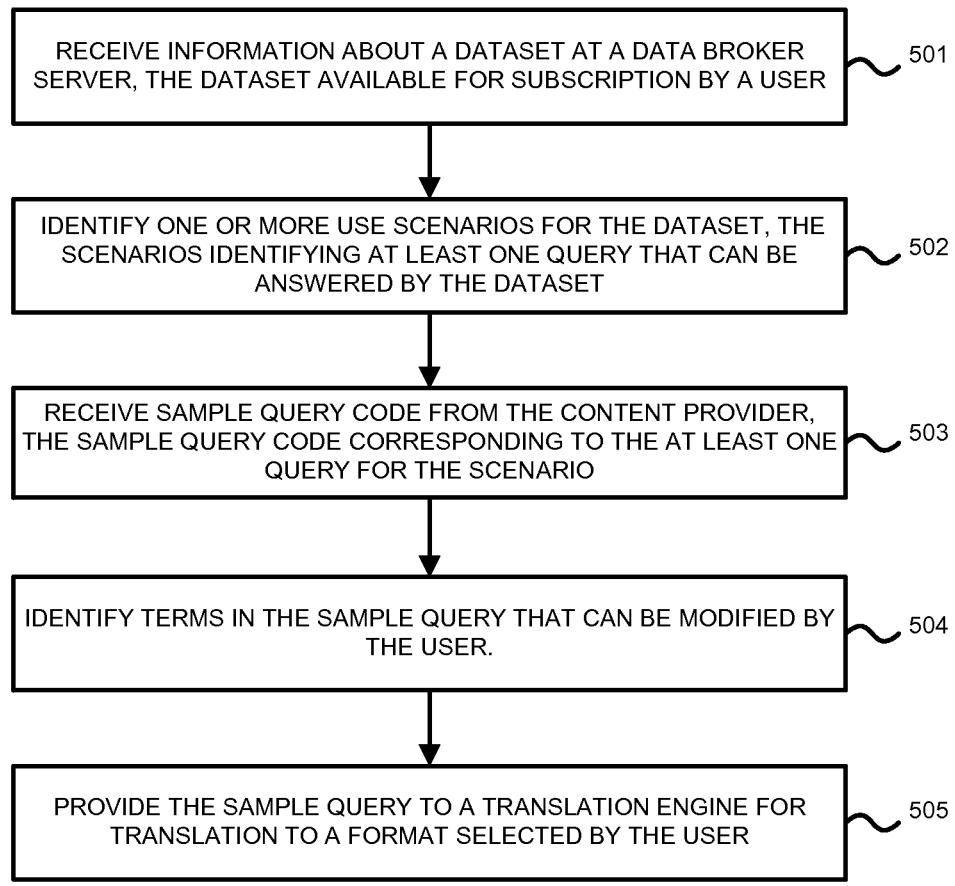
FIG. 5 is a flowchart illustrating one method or process for receiving dataset information from a content provider or dataset publisher to be offered by a data broker according to one embodiment.

FIG. 5 is a flowchart illustrating one method or process for receiving dataset information from a content provider or dataset publisher to be offered by a data broker according to one embodiment. In step 501, information about a dataset is received at a data broker server from a content provider. The dataset is available for subscription by a user, which may be a periodic payment for continued use or a one-time purchase of dataset access. The dataset may be stored at the data broker server or at a location remote from the data broker server. The information received from the content provider may identify one or more use scenarios for the dataset in step 502. The scenarios identify at least one query that can be answered by the dataset.

A sample query code is received from the content provider in step 503. The sample query code corresponds to the at least one query for the scenario. In step 504, terms are identified in the sample query that can be modified by the user. The sample query code may be provided to the user. In step 505, the sample query is provided to a translation engine for translation to a format selected by the user. The sample query may be translated to a protocol-specific format or a platform-specific format selected by the user. The translated query maintains the semantic meaning of the sample query.

Figure 6:
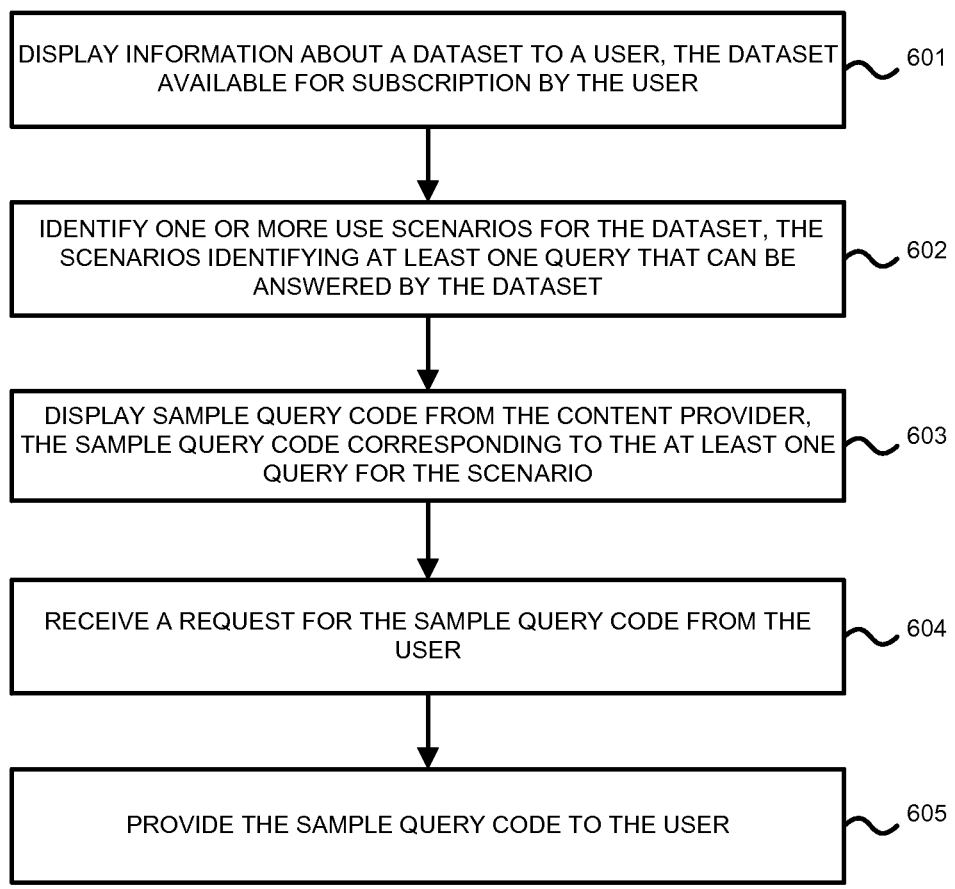
FIG. 6 is a flowchart illustrating one method or process for providing dataset information to a user by a data broker according to one embodiment.

FIG. 6 is a flowchart illustrating one method or process for providing dataset information to a user by a data broker according to one embodiment. In step 601, information about a dataset is displayed to a user. The dataset is available for subscription by the user, such as a recurring or one-time payment for access to the dataset. In step 602, one or more use scenarios for the dataset are identified. The scenarios identify at least one query that can be answered by the selected dataset. Sample query code for the dataset is displayed in step 603. The sample query code corresponds to the at least one query for the scenario.

In step 604, a request for the sample query code is received from the user. The sample query code is provided to the user in step 605. In some embodiments, a query-format identification may be received from the user. The sample query code may be provided to a translation engine for translation to the format selected by the user. The sample query may be translated to a protocol-specific format or a platform-specific format selected by the user.

It will be understood that steps 501-505 of the process illustrated in FIG. 5 and steps 601-605 of the process illustrated in FIG. 6 may be executed simultaneously and/or sequentially. It will be further understood that each step may be performed in any order and may be performed once or repetitiously.

Figure 7:
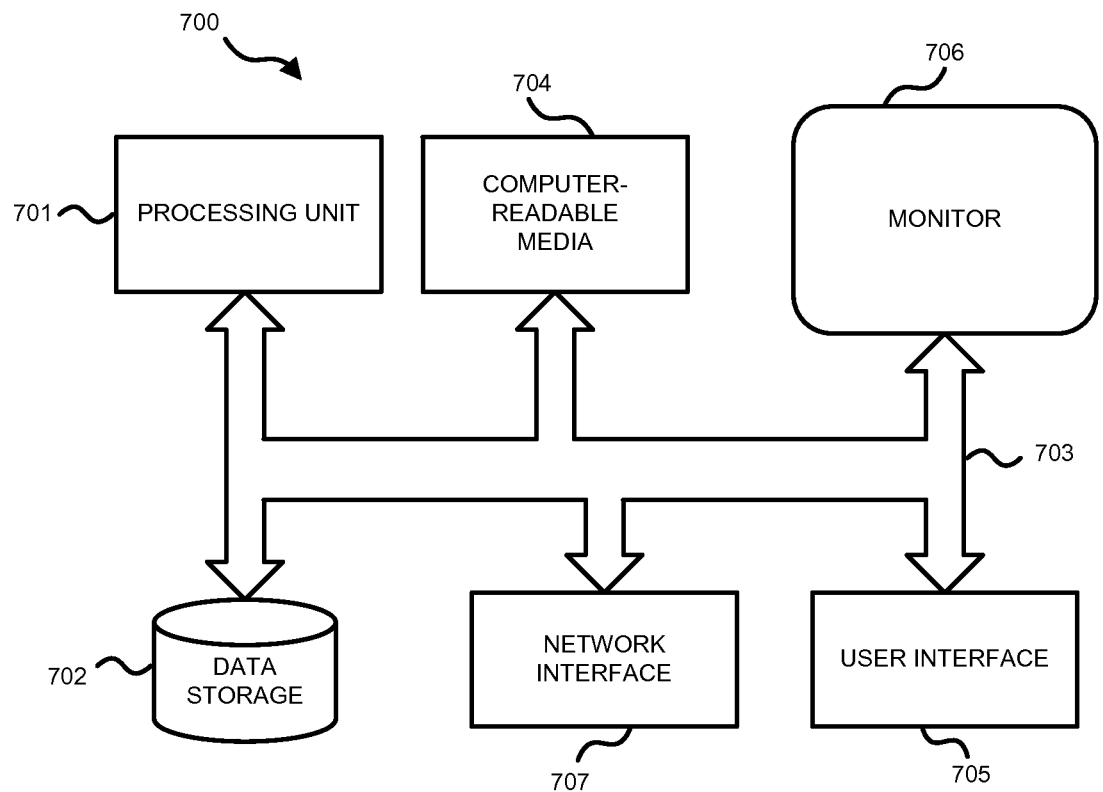
FIG. 7 illustrates an example of a suitable computing and networking environment.

FIG. 7 illustrates an example of a suitable computing and networking environment 700 on which the examples of FIGS. 1-4 may be implemented. The computing system environment 700 is only one example of a suitable computing environment and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 7, an exemplary system for implementing various aspects of the invention may include a general purpose computing device in the form of a computer 700. Components may include, but are not limited to, various hardware components, such as processing unit 701, data storage 702, such as a system memory, and system bus 703 that couples various system components including the data storage 702 to the processing unit 701. The system bus 703 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 700 typically includes a variety of computer-readable media 704. Computer-readable media 704 may be any available media that can be accessed by the computer 700 and includes both volatile and nonvolatile media, and removable and non-removable media, but excludes propagated signals. By way of example, and not limitation, computer-readable media 704 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 700. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 702 includes computer storage media in the form of volatile and/or nonvolatile memory such as read only memory (ROM) and random access memory (RAM). A basic input/output system (BIOS), containing the basic routines that help to transfer information between elements within computer 700, such as during start-up, is typically stored in ROM. RAM typically contains data and/or program modules that are immediately accessible to and/or presently being operated on by processing unit 701. By way of example, and not limitation, data storage 702 holds an operating system, application programs, and other program modules and program data.

Data storage 702 may also include other removable/non-removable, volatile/nonvolatile computer storage media. By way of example only, data storage 702 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 7, provide storage of computer-readable instructions, data structures, program modules and other data for the computer 700.

A user may enter commands and information through a user interface 705 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing unit 701 through a user input interface 705 that is coupled to the system bus 703, but may be connected by other interface and bus structures, such as a parallel port, game port or a universal serial bus (USB). A monitor 706 or other type of display device is also connected to the system bus 703 via an interface, such as a video interface. The monitor 706 may also be integrated with a touchscreen panel or the like. Note that the monitor and/or touch screen panel can be physically coupled to a housing in which the computing device 700 is incorporated, such as in a tablet-type personal computer. In addition, computers such as the computing device 700 may also include other peripheral output devices such as speakers and printer, which may be connected through an output peripheral interface or the like.

The computer 700 may operate in a networked or cloud-computing environment using logical connections 707 to one or more remote devices, such as a remote computer. The remote computer may be a personal computer, a server, a router, a network PC, a peer device or other common network node, and typically includes many or all of the elements described above relative to the computer 700. The logical connections depicted in FIG. 7 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 700 may be connected to a public or private network through a network interface or adapter 707. In some embodiments, a modem or other means for establishing communications over the network. The modem, which may be internal or external, may be connected to the system bus 703 via the network interface 707 or other appropriate mechanism. A wireless networking component such as comprising an interface and antenna may be coupled through a suitable device such as an access point or peer computer to a network. In a networked environment, program modules depicted relative to the computer 700, or portions thereof, may be stored in the remote memory storage device. It may be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, implemented at a computer system that includes one or more processors, for providing access to datasets, the method comprising:

identifying a plurality of dataset descriptions that are provided by one or more dataset publishers, each dataset description describing a corresponding dataset provided by one of the one or more dataset publishers and including one or more sample queries that illustrate a syntax and a use scenario for querying the corresponding dataset, the one or more sample queries being in a first format provided by the corresponding dataset publisher;

generating a dataset listing user interface that includes a listing of a plurality of datasets that are available for subscription by dataset subscriber computer systems, each listed dataset corresponding to one of the plurality of dataset descriptions;

based at least on receiving a selection of a particular one of the plurality of listed datasets at the dataset listing user interface, generating a dataset subscription user interface, the dataset subscription user interface presenting the one or more sample queries from a particular dataset description that corresponds to the particular listed dataset, the dataset subscription user interface also including a plurality of query translation user interface elements, each query translation user interface element being user-selectable to translate at least one of the one or more sample queries to a format corresponding to the query translation user interface element;

based on selection of one of the query translation user interface elements at the dataset subscription user interface, translating the at least one of the one or more sample queries into the specified format, wherein the translated format has a different syntax than the first format and is understandable by the subscriber computer system; and providing the translated at least one of the one or more sample queries to the subscriber computer system.

2. The method of claim 1, wherein the at least one sample query is provided to a translation engine for translation to the translated format selected by the user.

3. The method of claim 1, further comprising storing at least one corresponding dataset provided by one of the one or more dataset publishers.

4. The method of claim 1, wherein at least one corresponding dataset provided by one of the one or more dataset publishers is stored at a location of the one or more dataset publishers.

5. The method of claim 1, wherein each sample query also identifies one or more user-modifiable query parameters.

6. The method of claim 5, further comprising receiving a modified sample query comprising at least one of the one or more modifiable query parameters having been modified.

7. The method of claim 1, wherein the dataset subscription user interface also comprises at least one of (i) an option for the user to subscribe/purchase access to the particular listed dataset; (ii) metadata, including a dataset name of the particular listed dataset, a billing structure of the particular listed dataset, a maintenance/update schedule of the particular listed dataset, and a database type of the particular listed dataset; (iii) an identifier of a location of the particular listed dataset; (iv) a description of the particular listed dataset comprising an explanation of the type of data that can be accessed in the particular listed dataset; and (v) an image comprising a visualization of the type of results that can be provided by the particular listed dataset.

8. The method of claim 1, further comprising receiving at least one corresponding dataset provided by one of the one or more dataset publishers to be stored locally.

9. A computer system, comprising:
one or more processors;
system memory; and
one or more computer readable storage media having stored thereon computer-executable instructions that are executable by the one or more processors to cause the computer system to provide access to datasets, the computer-executable instructions including instructions that are executable to cause the computer system to perform at least the following:
identify a plurality of dataset descriptions that are provided by one or more dataset publishers, each dataset description describing a corresponding dataset provided by one of the one or more dataset publishers and including one or more sample queries that illustrate a syntax and a use scenario for querying the corresponding dataset, the one or more sample queries being in a first format provided by the corresponding dataset publisher;
generate a dataset listing user interface that includes a listing of a plurality of datasets that are available for subscription by dataset subscriber computer systems, each listed dataset corresponding to one of the plurality of dataset descriptions;
based at least on receiving a selection of a particular one of the plurality of listed datasets at the dataset listing user interface, generate a dataset subscription user interface, the dataset subscription user interface presenting the one or more sample queries from a particular dataset description that corresponds to the particular listed dataset, the dataset subscription user interface also including a plurality of query translation user interface elements, each query translation user interface element being user-selectable to translate at least one of the one or more sample queries to a format corresponding to the query translation user interface element;
based on selection of one of the query translation user interface elements at the dataset subscription user interface, translate the at least one of the one or more sample queries into the specified format, wherein the translated format has a different syntax than the first format and is understandable by subscriber computer system; and
provide the translated at least one of the one or more sample queries to the subscriber computer system.

10. The computer system of claim 9, wherein at least one sample query is provided to a translation engine for translation to the translated format selected by the user.

11. The computer system of claim 9, wherein at least one corresponding dataset provided by one of the one or more dataset publishers is stored at a location of the one or more dataset publishers.

12. The computer system of claim 9, wherein each sample query also identifies one or more user-modifiable query parameters.

13. The computer system of claim 12, wherein a modified sample query is received that comprises at least one of the one or more modifiable query parameters having been modified.

14. The computer system of claim 9, wherein the dataset subscription user interface also comprises at least one of (i) an option for the user to subscribe/purchase access to the particular listed dataset; (ii) metadata, including a dataset name of the particular listed dataset, a billing structure of the particular listed dataset, a maintenance/update schedule of the particular listed dataset, and a database type of the particular listed dataset; (iii) an identifier of a location of the particular listed dataset; (iv) a description of the particular listed dataset comprising an explanation of the type of data that can be accessed in the particular listed dataset;
and (v) an image comprising a visualization of the type of results that can be provided by the particular listed dataset.

15. A computer program product comprising one or more hardware storage devices having stored thereon computer-executable instructions that are executable by one or more processors of a computing system to cause the computing system to provide access to datasets, the computer-executable instructions including instructions that are executable to cause the computing system to perform at least the following:
identify a plurality of dataset descriptions that are provided by one or more dataset publishers, each dataset description describing a corresponding dataset provided by one of the one or more dataset publishers and including one or more sample queries that illustrate a syntax and a use scenario for querying the corresponding dataset, the one or more sample queries being in a first format provided by the corresponding dataset publisher;
generate a dataset listing user interface that includes a listing of a plurality of datasets that are available for subscription by dataset subscriber computer systems, each listed dataset corresponding to one of the plurality of dataset descriptions;
based at least on receiving a selection of a particular one of the plurality of listed datasets at the dataset listing user interface, generate a dataset subscription user interface, the dataset subscription user interface presenting the one or more sample queries from a particular dataset description that corresponds to the particular listed dataset, the dataset subscription user interface also including a plurality of query translation user interface elements, each query translation user interface element being user-selectable to translate at least one of the one or more sample queries to a format corresponding to the query translation user interface element
based on selection of one of the query translation user interface elements at the dataset subscription user interface, translate the at least one of the one or more sample queries into the specified format, wherein the translated format has a different syntax than the first format and is understandable by the subscriber computer system;
provide the translated at least one of the one or more sample queries to the subscriber computer system.

16. The computer program product of claim 15, wherein the at least one sample query is provided to translation engine for translation to the translated format selected by the user.

17. The computer program product of claim 15, wherein at least one corresponding dataset provided by one of the one or more dataset publishers is stored at a location of the one or more dataset publishers.

18. The computer program product of claim 15, wherein each sample query also identifies one or more user-modifiable query parameters.

19. The computer program product of claim 18, wherein a modified sample query is received that comprises at least one of the one or more modifiable query parameters having been modified.

20. The computer program product of claim 15, wherein the dataset subscription user interface also comprises at least one of (i) an option for the user to subscribe/purchase access to the particular listed dataset; (ii) metadata, including a dataset name of the particular listed dataset, a billing structure of the particular listed dataset, a maintenance/update schedule of the particular listed dataset, and a database type of the particular listed dataset; (iii) an identifier of a location of the particular listed dataset; (iv) a description of the particular listed dataset comprising an explanation of the type of data that can be accessed in the particular listed dataset; and (v) an image comprising a visualization of the type of results that can be provided by the particular listed dataset.

* * * * *